(12) United States Patent
Honma

(10) Patent No.: US 8,001,323 B2
(45) Date of Patent: Aug. 16, 2011

(54) NETWORK STORAGE SYSTEM, MANAGEMENT METHOD THEREFOR, AND CONTROL PROGRAM PRODUCT THEREFOR

(75) Inventor: Kazuya Honma, Tokyo (JP)

(73) Assignee: NEC Corporation, Tokyo (JP)

( * ) Notice: Subject to any disclaimer, the term of this patent is extended or adjusted under 35 U.S.C. 154(b) by 666 days.

(21) Appl. No.: 12/041,200

(22) Filed: Mar. 3, 2008

(65) Prior Publication Data
US 2008/0229040 A1  Sep. 18, 2008

(30) Foreign Application Priority Data
Mar. 12, 2007 (JP) ................................. 2007-062097

(51) Int. Cl.
*G06F 12/00* (2006.01)
(52) U.S. Cl. ........................................ 711/114; 711/118
(58) Field of Classification Search .................... 711/114
See application file for complete search history.

(56) References Cited

U.S. PATENT DOCUMENTS

| 6,192,408 B1 * | 2/2001 | Vahalia et al. ................ 709/229 |
| 2003/0126242 A1 * | 7/2003 | Chang ........................... 709/222 |
| 2003/0208675 A1 * | 11/2003 | Burokas et al. .................. 713/1 |
| 2007/0250610 A1 * | 10/2007 | Haun et al. .................... 709/222 |

FOREIGN PATENT DOCUMENTS

| JP | 2000-181636 A | 6/2000 |
| JP | 2000-259583 A | 9/2000 |
| JP | 2003-288259 A | 10/2003 |

* cited by examiner

*Primary Examiner* — Tuan V Thai
*Assistant Examiner* — Ngoc V Dinh
(74) *Attorney, Agent, or Firm* — Dickstein, Shapiro, LLP.

(57) ABSTRACT

A storage system, a storage management method, and a control program product are provided. The storage system is improved in comfortability, convenience, and economy by reducing the amount of copies in a storage device in a network storage system, by heightening storage efficiency and increasing an access speed. In a network storage system in which a plurality of client terminals are directly connected to a storage device via a network, the storage device includes an MV logical disk that stores read-only shared data and a BV logical disk from/onto which data specific to each client terminal is read/written. A control unit that controls read/write operations includes, with an access management table, an LDK management table which has a reference logical disk number column used to issue a command to refer to the MV logical disk when data other than the write data is read.

3 Claims, 7 Drawing Sheets

FIG. 2

| CLIENT IDENTIFIER (Initiator Name) | LOGICAL DISK NUMBER (LDK) |
|---|---|
| Initiator A | 1 |
| Initiator B | 2 |
| Initiator C | 3 |
| : | : |

FIG. 3

| LOGICAL DISK NUMBER (LDK) | VOLUME ATTRIBUTE | REFERENCE LOGICAL DISK NUMBER (LDK) | CONVERSION MAP | |
|---|---|---|---|---|
| 0 | MV | — | — | |
| 1 | BV | 0 | LOGICAL ADDRESS | PHYSICAL ADDRESS |
| | | | 123 | 0 |
| | | | .. | .. |
| 2 | BV | 0 | LOGICAL ADDRESS | PHYSICAL ADDRESS |
| | | | 0 | 0 |
| | | | 456 | 1 |
| | | | .. | .. |
| 3 | BV | 0 | LOGICAL ADDRESS | PHYSICAL ADDRESS |
| | | | .. | .. |
| .. | .. | .. | .. | |
| m | NV | — | — | |

NETWORK STORAGE SYSTEM, MANAGEMENT METHOD THEREFOR, AND CONTROL PROGRAM PRODUCT THEREFOR

CROSS-REFERENCE TO RELATED APPLICATION

This application is based upon and claims the benefit of priority from Japanese patent application No. 2007-062097, filed on Mar. 12, 2007, the disclosure of which is incorporated herein in its entirety by reference.

BACKGROUND OF THE INVENTION

1. Field of the Invention

The present invention relates to a storage system and a management method therefor, and, more particularly, to a network storage system, a storage-device management method, and a control program.

2. Description of the Related Art

Recently, the importance of security enhancement, such as prevention of private information leakage, has risen, and a network boot system has been proposed in which all information is managed and operated on a server without providing a PC (personal computer) of a client with a storage device, such as a hard disk, and the client PC is booted from information on the server. FIG. 6 illustrates one example of the system formed as described above. Clients 10 are connected to a server 90 via a network 20. The server 90 can form a boot image of a client PC on the server from a boot image stored in a storage device 40 and information, such as TempA, unique to each client, can transmit the resulting boot image, and can boot the client PC.

Recently, an iSCSI (Internet Small Computer System Interface) protocol has appeared according to which a client PC and a storage can be directly connected together via a network without being connected through a server. In the iSCSI protocol, a remote storage connected by the Internet can be logically shown in the same way as a local storage using an SCSI protocol by putting an SCSI command or data on a TCP/IP packet. The use of the iSCSI protocol makes it possible to remove the above-mentioned server and to simplify a system structure.

FIG. 7 illustrates a structure in which a client 10 and a storage 40 are directly connected together via a network 20 by use of the iSCSI protocol to eliminate a server. The storage 40 includes a host interface 50 that performs read/write processing from the client 10, a cache memory 60 that temporarily stores the data of a logical disk (LDK) 70, the logical disk (LDK) 70 logically formed on one or more physical disks, and a control unit 80 that controls these elements. In the structure formed as described above, in which the client 10 and the storage 40 are directly connected together, the logical disk (LDK) 70 is allocated to each client 10, and hence each LDK 70 is required to be shown to each client by means of an access management table 81 provided in the control unit 80. A method for showing each LDK to each client by means of the access management table 81 is known by, for example, Japanese Published Unexamined Patent Application No. 2000-181636 (NEC) (Patent Document 1). FIG. 7 shows an example in which an LDK1 is allocated to client A, an LDK2 is allocated to client B, and an LDK3 is allocated to client C.

The structure mentioned above has the following problems.

A first problem is that much time is consumed to prepare an LDK used for booting. The LDK 70 provided in the storage 40 is required to be made for each client 10, and is made according to the following procedure. First, a master LDK is made, and an image used for booting is stored in this LDK (in FIG. 7, LDK0 is used as the master LDK). Thereafter, an LDK used for a client is made, and all of the contents of the master LDK0 are copied onto this client LDK. This copy operation have to be carried out by the number of client LDKs (in FIG. 7, LDK1, LDK2, and LDK3 are made for three clients, respectively, and the copy operation from the LDK0 to each LDK is carried out). Thereafter, an access management table is set to permit access from each client. The reason why copying from the master LDK0 onto the client LDK is required is to deal with a case in which setting change or log-writing is performed from a client upon booting. A difference created by changing is stored in each LDK (in FIG. 7, the difference is shown as TempA, TempB, and TempC).

A second problem is that the capacity efficiency of the entire storage is low. The client LDKs are made by copying from the master LDK, and the contents stored in one of the client LDKs are the same as each of the other client LDKs if the change difference is excluded from the contents of each client LDK. Normally, the change difference is small with respect to the image used for booting, and hence a plurality of client LDKs in which each client LDK contains almost the same contents as the other client LDKs is provided in the storage. This problem is worsened in proportion to the number of clients to be connected.

A third problem is that the use efficiency of the cache memory in the storage is low. The cache memory is used for each LDK when a plurality of clients make reading requests, respectively. Likewise, in this case, the LDKs have almost the same contents, respectively, and hence wasteful operations are performed in the same way as in the second problem.

Without being limited to the network boot system, these three problems also exist in a network storage system, such as a book reading/browsing system (which has a function to send book data from a master LDK to a client and to allow the client to individually attach a bookmarker to the book data), in which each client is directly connected to a storage so as to exchange information with each other and in which the clients share the information with each other.

Therefore, in this description, the term "network storage system" is hereinafter used as a fairly wide concept including the "network boot system."

SUMMARY OF THE INVENTION

It is an exemplary object of the present invention to provide a network storage system capable of reducing the amount of copies in the network storage system, heightening storage efficiency, increasing access speed, and improving comfortability, convenience, and economy, and to provide a storage management method, and a control program.

To achieve the exemplary object, a network storage system according to an exemplary aspect of the present invention is formed so that a plurality of client terminals and a storage device that stores data read and written by the client terminals are directly connected to each other via a network. In this network storage system, the storage device includes an MV logical disk (MV: master volume) that stores read-only shared data sharable among the client terminals, a BV logical disk (BV: boot volume) from which or onto which specific data correlated with each client terminal is read and written, and a control unit which controls reading and writing between the logical disks and the client terminals. The control unit determines whether a piece of read command data about a read command issued from a client is present in the BV logical disk correlated with each client terminal, and, if the read command data is not present in the BV logical disk, the control unit reads the read command data from the MV logical disk, and performs virtual-memory control to send the read command data read therefrom to the client.

In the above example, the present invention is embodied as a network storage system serving as hardware. However, the present invention may be embodied as a method or a program serving as software.

A storage management method according to another exemplary aspect of the present invention is a method of managing a storage device connected to a plurality of client terminals via a network to include an MV logical disk (MV: master volume) that stores read-only shared data and a BV logical disk (BV: boot volume) from which or onto which data specific to each client terminal is read and written, and the method including steps of: referring to an LDK management table of the BV logical disk correlated with the client terminal; determining whether a logical address is present in a conversion map column of the LDK management table; acquiring a physical address from the conversion map and performing a reading or writing operation if the logical address is present in the conversion map column of the LDK management table; and acquiring an MV number from a reference logical disk number column of the LDK management table and performing a reading or writing operation from the MV logical disk if the logical address is not present in the conversion map column of the LDK management table.

A storage control program product according to still another exemplary aspect of the present invention is a program product for controlling a storage device connected to a plurality of client terminals via a network to include an MV logical disk (MV: master volume) that stores read-only shared data and a BV logical disk (BV: boot volume) from which or onto which data specific to each client terminal is read and written. A storage control program stored in the storage control program product causes a computer to execute a function to refer to an LDK management table of the BV logical disk correlated with each client terminal; a function to determine whether a logical address is present in a conversion map column of the LDK management table or not; a function to acquire a physical address from the conversion map so as to perform a reading or writing operation if the logical address is present in the conversion map column of the LDK management table; and a function to acquire an MV number from a reference logical disk number column of the LDK management table and then read data thereabout from the MV logical disk if the logical address is not present in the conversion map column of the LDK management table.

BRIEF DESCRIPTION OF THE DRAWINGS

FIG. 2 is a schematic view of an access management table according to this exemplary embodiment;

FIG. 3 is a schematic view of an LDK management table according to this exemplary embodiment;

DESCRIPTION OF EXEMPLARY EMBODIMENTS

Next, a network storage system that is an exemplary embodiment of the invention will be described with reference to the attached drawings.

Figure 1:
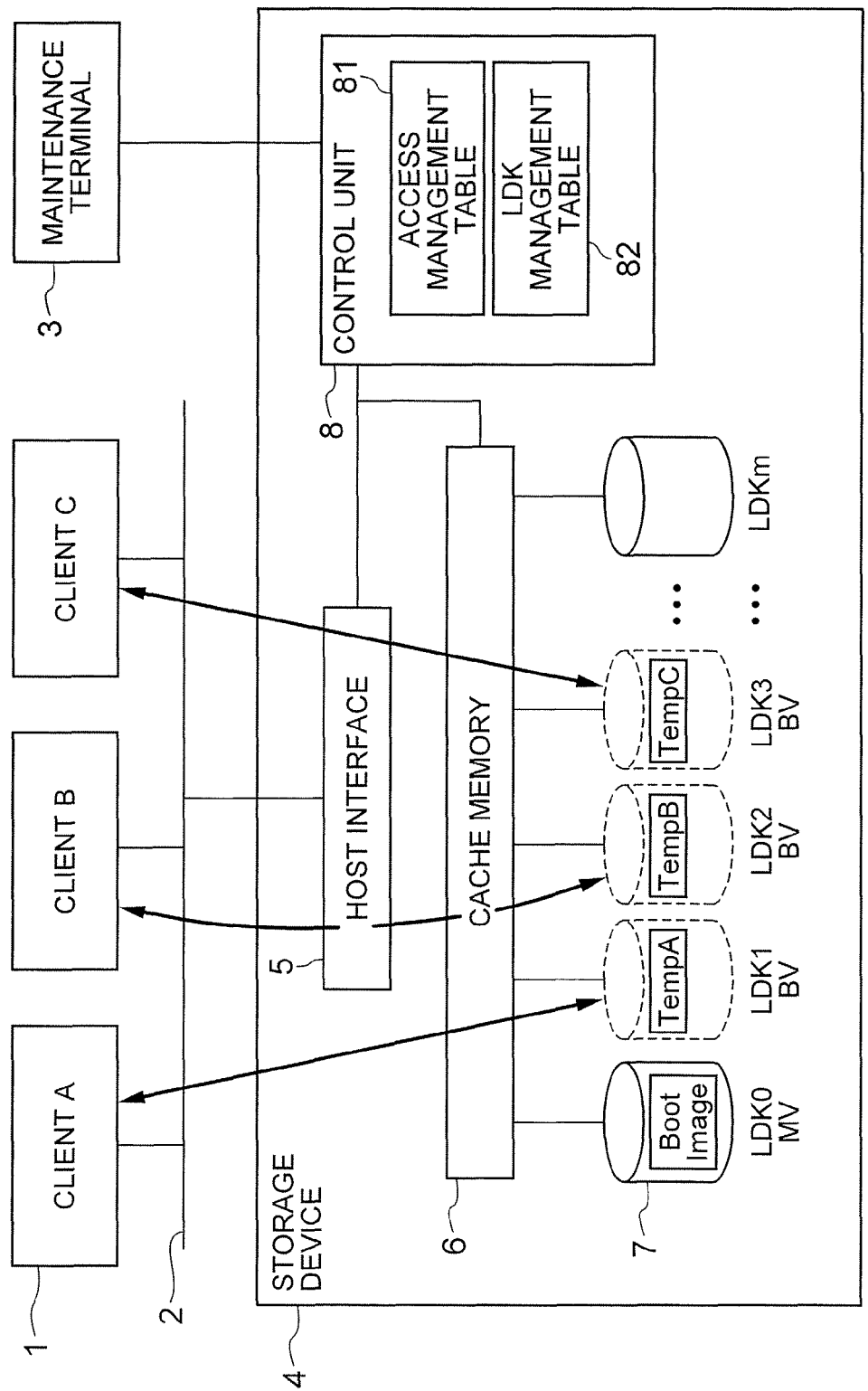
FIG. 1 is a block diagram showing a structure of a network storage system according to an exemplary embodiment of the invention.

As shown in FIG. 1, a client 1 (generally, n (integer) clients may be provided although three clients, i.e., client A, client B, and client C are provided for descriptive convenience in FIG. 1), which serves as a client terminal, is directly connected to a storage device 4 via a network 2. The client 1 and the storage device 4 can directly read and write data by use of the iSCSI protocol.

The storage device 4 is made up of a host interface 5 realized by an interface control LSI that performs processing to a read request and a write request from the client 1, a high-speed accessible cache memory 6 that temporarily stores the data of a logical disk 7, the logical disk (LDK) 7 logically formed on one or more physical disks, and a control unit 8 that controls these elements.

Here, prior to giving a detailed description, the main points of the present invention will be described.

In the network storage system according to this exemplary embodiment, a plurality of client terminals 1 and the storage device 4 that stores data read and written by these client terminals 1 are directly connected to each other via the network 2.

The storage device 4 includes an MV logical disk (MV: master volume) that stores read-only shared data that is sharable among the client terminals 1, a BV logical disk (BV: boot volume) from which or onto which specific data correlated with each client terminal 1 is read or written, and the control unit 8 that controls reading and writing performed between the logical disk 7 and each client terminal 1.

The control unit 8 determines whether data about a read command emitted from the client 1 is present or not in the BV logical disk 7 correlated with the client 1. If the read command data is not present in the BV logical disk 7, the control unit 8 reads the read command data from the MV logical disk 7, and performs virtual-memory-like control to send the data read therefrom to the client.

Therefore, in the control unit 8, data in which two kinds of data, i.e., read-only shared data, which is enormous in quantity, and specific data depending on each client are aggregated together is stored and managed in such a manner as to be separated into the MV logical disk 7 and the BV logical disk 7, and these two kinds of data are read and written when necessary. Since this control unit 8 is provided, it becomes possible to shorten setup time resulting from a reduction in wasteful copy operation performed before the start of operation between the logical disks 7, and becomes possible to heighten disk use efficiency.

Additionally, in this exemplary embodiment, the control unit 8 is provided with an access management table 81 that correlates each client 1 with the BV logical disk 7. Additionally, an LDK management table 82 is provided in parallel with the access management table 81. The LDK management table 82 issues a command to refer to the MV logical disk 7 if a read command data is not present in the BV logical disk 7. The control unit 8 reads the read command data while referring to the access management table 81 and the LDK management table 82.

The control unit 8 can easily control MV data and BV data, which are managed in a manner divided into two kinds of data, by means of the access management table 81 and the LDK management table 82, so that it becomes possible to provide a system improved in efficiency and economy by restraining the use of a disk capacity and the wasteful operation of copying and storing a large amount of MV data by the number of clients 1, which is a problem in related technical fields.

The LDK management table 82 has a column used to manage the attribute of the logical disk and a conversion map column used to manage the address mapping of write data, in addition to a reference logical disk number column used to issue a command to refer to the MV logical disk.

Additionally, the cache memory 6 that temporarily stores read/write data sent from the logical disk 7 is also provided parallel in the control unit 8. The control unit 8 first determines whether read-command data is present or not on the cache memory 6 with respect to a read command emitted from the client 1 by use of the data holding function of the cache memory 6.

As described above, since data is divided into two kinds of data and is stored in the logical disk 7, it is possible to provide a system in which the hit rate of the cache memory can be expected to be heightened when shared data is read, in which the speed of the boot operation can be increased, and in which convenience and comfortability can be improved in addition to improvements in efficiency and economy mentioned above.

Additionally, the Internet using the iSCSI protocol, or LAN, or SAN using the fiber channel protocol can be used as the network 2.

Next, the structure and operation of the storage device will be described in detail.

The storage device 4 is made up of the host interface 5 realized by an interface control LSI that performs processing to a read request and a write request from the client 1, the high-speed accessible cache memory 6 that temporarily stores the data of the logical disk 7, the logical disk (LDK) 7 logically formed on one or more physical disks, and the control unit 8 that controls these elements.

The control unit 8 includes an MPU (not shown) and a local memory realized by a semiconductor memory, such as RAM or ROM. The control unit 8 is operated by firmware stored in the local memory. The access management table 81 and the LDK management table 82 are disposed on the local memory. The access management table 81 manages the correlation of any one of the logical disks (LDK) 7 with the client 1. The LDK management table 82 manages the volume attribute of the logical disk (LDK) 7.

As shown in FIG. 2, the access management table 81 consists of client identifiers each of which has each individual value for each client to identify each client and logical disk (LDK) numbers each of which is allocated to each client. In this exemplary embodiment, Initiator Names each of which has a value specific to each Initiator in the iSCSI protocol are set as the client identifiers. Herein, Initiator Name of client A is set as Initiator A, Initiator Name of client B is set as Initiator B, and Initiator Name of client C is set as Initiator C.

As shown in FIG. 3, the LDK management table 82 consists of logical disk (LDK) numbers, volume attributes, reference logical disk numbers, and conversion maps. The volume attribute shows the attribute of an LDK indicated by a logical disk number. An LDK which is to be a client LDK is managed as a boot volume (BV), an LDK which is to be a master LDK is managed as a master volume (MV), and an LDK which is to be other than the client and master LDKs is managed as a normal volume (NV).

The reference logical disk number and the conversion map become effective only when the volume attribute is a BV. The reference logical disk number shows the correlation of this BV with any one of the MVs. The conversion map is a table used to convert a logical address indicated by the client 1 into a physical address, and is renewed when a write request into the BV is issued from the client 1.

For example, operations to form the access management table 81, the LDK management table 82, and the LDKs can be performed from a maintenance terminal 3 connected to the storage device 4.

Figure 4:
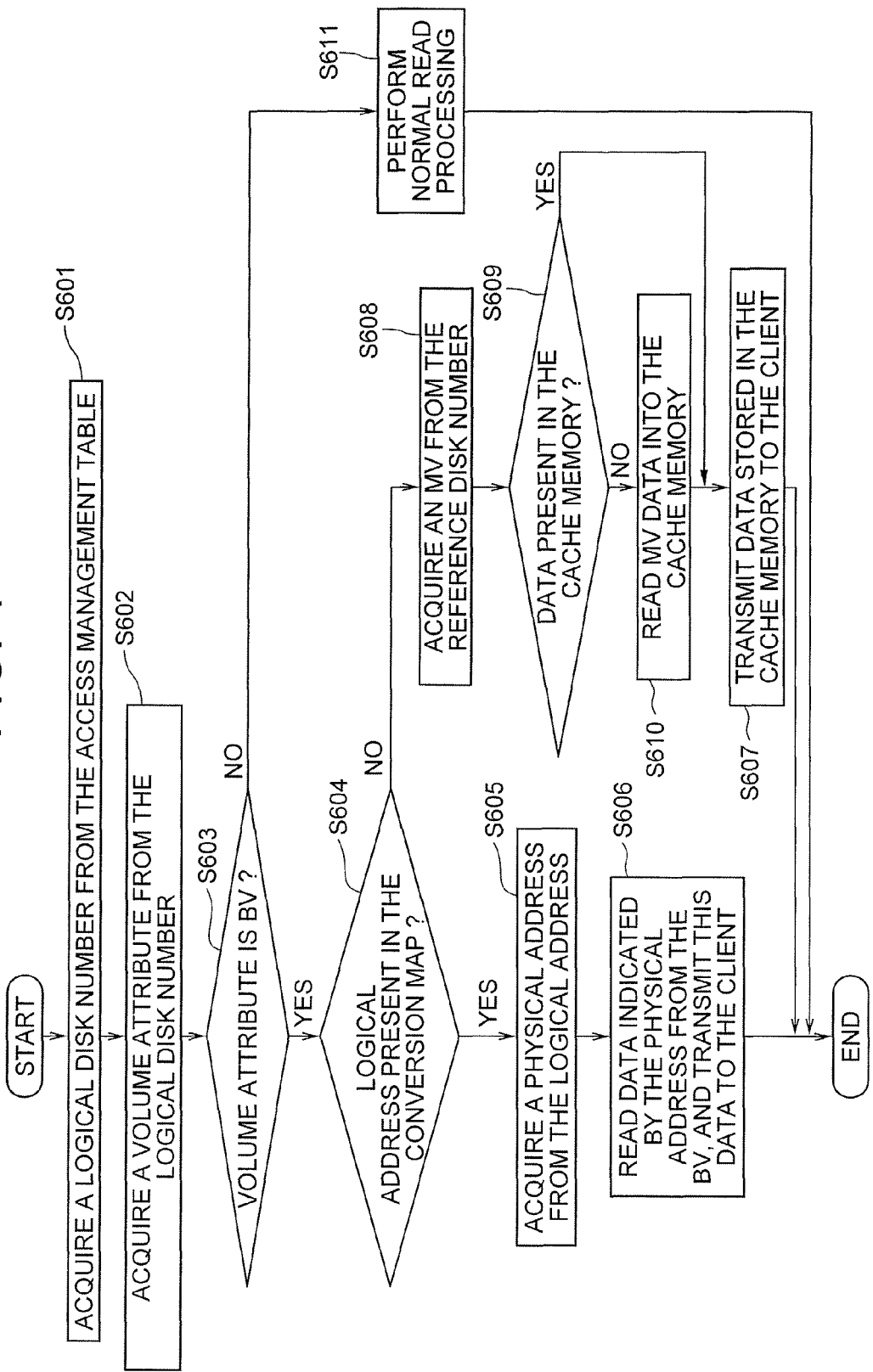
FIG. 4 is a flowchart of the operation of a storage device with respect to a read request issued from a client.

Next, the operation of the network storage system according to this exemplary embodiment will be described with reference to the attached drawings. FIG. 4 is a flowchart followed when a data read request is issued to the storage device 4 from the client 1.

The control unit 8 of the storage device 4 receives a read request from the client 1, and then examines the logical disk number from the access management table 81 based on the client identifier (Initiator Name) of the client 1 (step S601, reference step, reference processing). Thereafter, the control unit 8 examines the volume attribute from the LDK management table 82 based on the logical disk number (step S602). If the volume attribute is any one of the volumes except the BV here, normal read processing is performed (step S611).

If the volume attribute is the BV, it is examined whether or not the logical address of the read request issued from the client 1 is registered in the conversion map of the LDK management table 82 (step S604, determining step, determination processing). If the logical address is registered in the conversion map, a corresponding physical address is taken from the conversion map (step S605). Thereafter, data indicated by the physical address is read from the BV, and is transmitted to the client 1 (step S606, reading step, reading processing).

If the logical address is not registered in the conversion map, the MV is examined from the reference logical disk number of the LDK management table 82 (step S608). Thereafter, it is examined whether or not corresponding data is present in the cache memory 6 (step S609). If the corresponding data is present in the cache memory 6, this data is transmitted to the client 1 (step S607). If the corresponding data is not present therein, the data is read into the cache memory 6 from the MV (step S610, MV reading step, MV reading processing), and is transmitted to the client 1 (step S607).

Through this operation, data can be read from the MV via the BV, and a response can be made to a client when the client issues a read request to the storage upon booting. Additionally, data read from the MV once at the reading step is unfolded on the cache memory 6, and hence, when a read request is issued from another client, a response can be expected to be made to the client at higher speed than data-reading from the MV. As a result, the use efficiency of the cache memory is improved, and the boot time of the client can be quickened.

Figure 5:
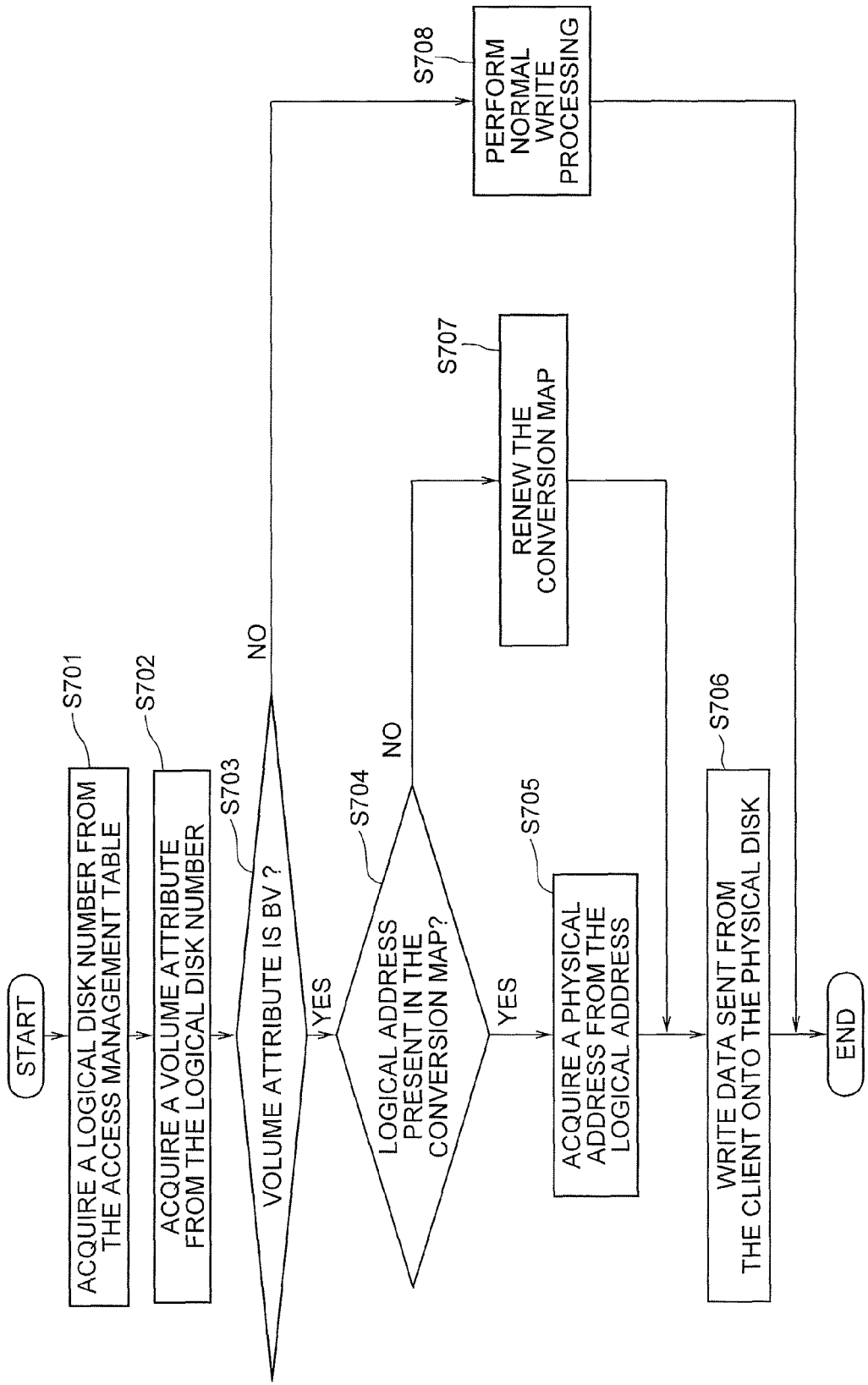
FIG. 5 is a flowchart of the operation of the storage device with respect to a write request issued from a client.
Figure 6:
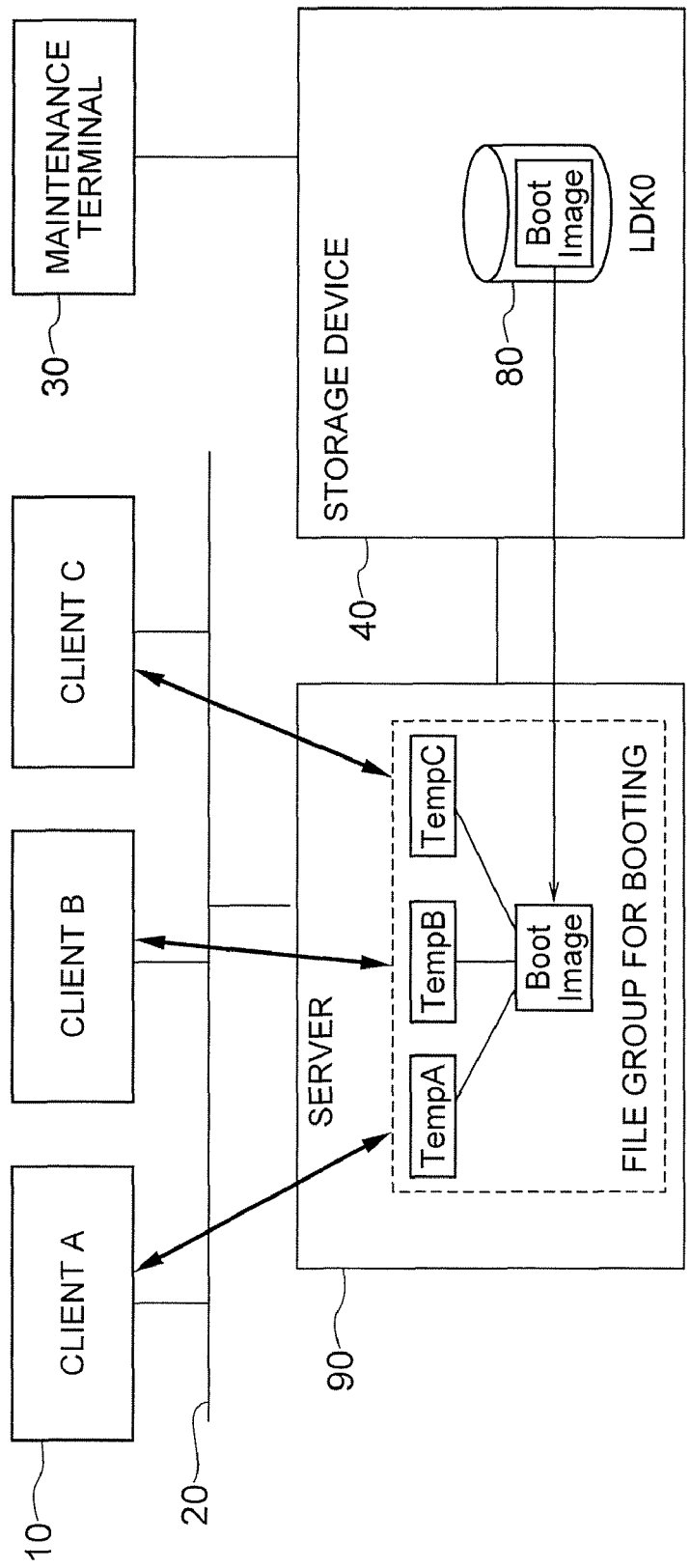
FIG. 6 is a block diagram of a network boot system via a server in a related technology.
Figure 7:
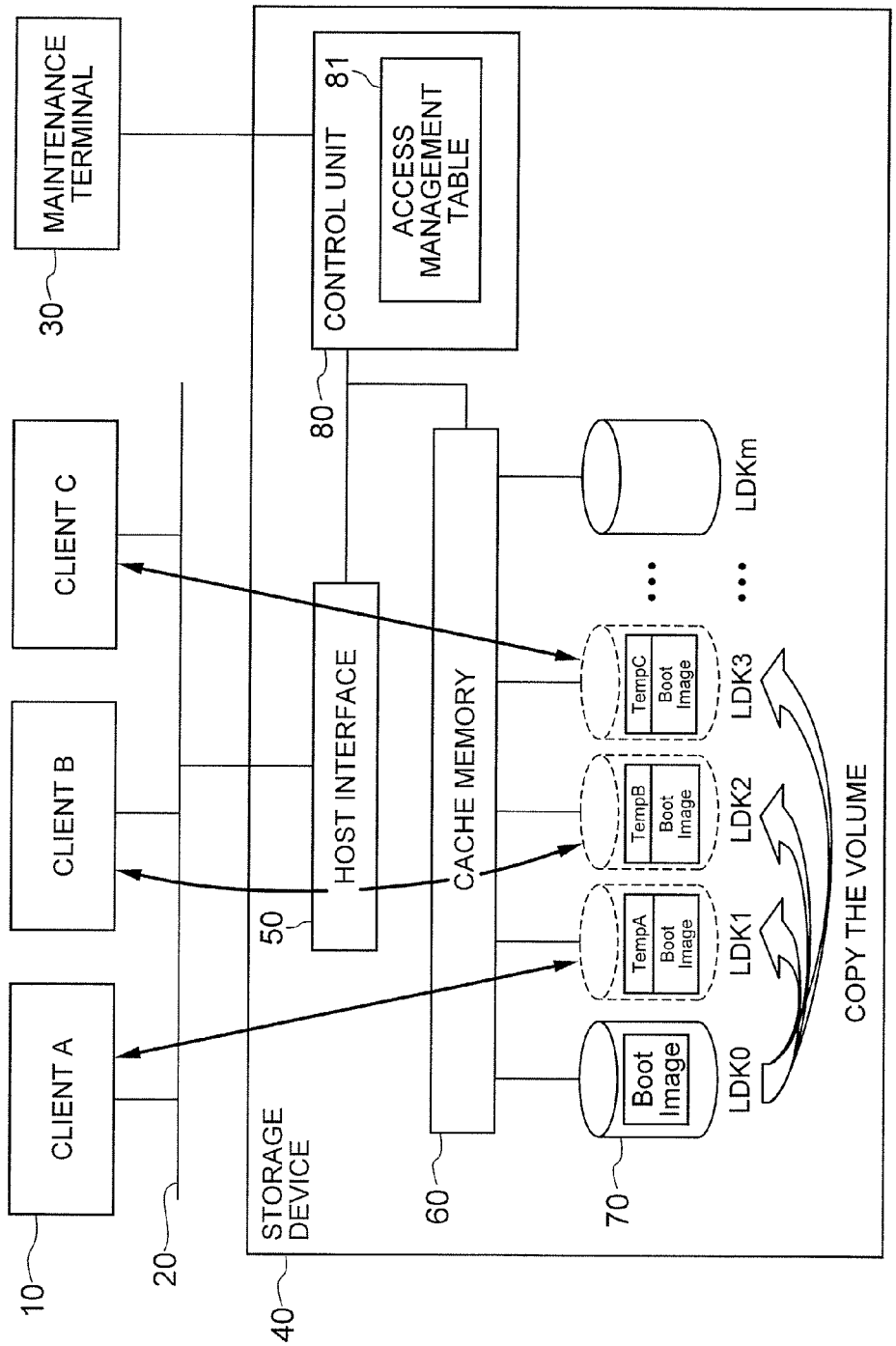
FIG. 7 is a block diagram of a network boot system in which a server has been removed in a related technology.

FIG. 5 is a flowchart followed when a write request to write data into the storage device 4 is issued from the client 1. When a write request is received from the client 1, the logical disk number is examined from the access management table 81 based on Initiator Name of the client 1 (step S701). Thereafter, the volume attribute is examined from the LDK management table 82 based on the resulting logical disk number (step S702, referring step, referring processing). If the volume attribute is any one of the volumes except the BV here, normal write processing is performed (step S708).

If the volume attribute is the BV, it is examined whether or not the logical address of the write request issued from the client 1 is registered in the conversion map of the LDK management table 82 (step S704, determining step, determination processing). If the logical address is registered in the conversion map, the physical address is taken from the conversion map (step S705), and data is written onto the address indicated by the physical address (step S706, writing step, write processing).

If the logical address is not registered in the conversion map, an unused physical address is calculated, and the conversion map is renewed (step S707). Thereafter, data transmitted from the client 1 is written into the calculated physical address (step S706, new writing step, new write processing).

As described above, write data can be registered in the conversion map, and can be stored in the BV when a write request is issued after booting. Therefore, the amount of data in the BV can be reduced, and the capacity efficiency of the entire storage can be heightened.

The above-mentioned various steps may be formed as a program executed by the computer.

In this exemplary embodiment, as an exemplary advantage according to the invention, an MV LDK can be used from a client LDK at once, and the operation of copying data from an MV before starting the operation of the client LDK becomes unnecessary. Therefore, the setup time is shortened, and the storage use efficiency is heightened, and hence the efficiency, economy, and comfortability of the system are improved.

Additionally, in the BV, write data from a client is managed by the conversion map, and, when data other than this write data is read, a response to the client is made by referring to data present in the MV. If a physical disk forming the BV is constructed as a virtual RAID at this time, data to be actually stored can be reduced, and the capacity efficiency of the entire storage can be heightened.

Additionally, data read by a client from the MV is temporarily stored in the cache memory, and, when a reading operation is performed from another client with respect to the same logical address afterwards, data in the cache memory can be expected to be returned to the client. As a result, the boot time of the second client terminal and the boot time of client terminals subsequent to the second one can be expected to be advantageously shortened.

An MV logical disk can be used from a client BV logical disk at once, and a copy operation performed to copy data onto a BV logical disk from an MV logical disk before the start of operations can be removed. As a result, the setup time can be shortened, the storage use efficiency can be heightened, and the efficiency, economy, and comfortability of the system can be improved.

Additionally, a boot image in which two kinds of data, i.e., read-only shared data, which is enormous in quantity, and specific data depending on each client are aggregated together is stored and managed in a manner separated into an MV logical disk and a BV logical disk. Furthermore, a control unit is provided which has a function to unite these two kinds of data together when necessary. Therefore, a wasteful copy operation performed between the logical disks before the start of operations can be removed, and hence the setup time can be shortened, and the disk use efficiency can be heightened.

Additionally, a boot image in which two kinds of data, i.e., read-only shared data, which is enormous in quantity, and specific data depending on each client are aggregated together is stored and managed in a separated manner, and an access management table and an LDK management table are provided both of which have a function to unite these two kinds of data together when necessary. Therefore, the control unit can easily control MV data and BV data that are managed in a manner separated into two kinds. Therefore, the wasteful operation of copying and storing a large amount of MV data by the number of clients can be restrained, and the use of the disk capacity can be restrained. As a result, efficiency and economy can be improved.

Additionally, in the BV logical disk, write data transmitted from the client is managed by the conversion map, and, when data other than the write data is read, a response is made to the client while referring to data stored in the MV logical disk. If a physical disk forming the BV logical disk is made as virtual RAID at this time, data to be actually stored can be reduced, and the capacity efficiency of the entire storage can be heightened.

Additionally, data read by a client from the MV logical disk is temporarily stored in the cache memory, and, when the data stored in the cache memory is read by another client afterwards, the data can be expected to be returned to the client. As a result, for example, the boot time of a client can be also expected to be advantageously shortened.

Next, another exemplary embodiment of the present invention will be described. In this exemplary embodiment, the following structure may be formed. In detail, the control unit is provided with an access management table that correlates each client with the BV logical disk. An LDK management table, which issues a command to refer to the MV logical disk when the read command data is not present in the BV logical disk, is provided in parallel to the access management table. The control unit reads the read command data while referring to the access management table and the LDK management table.

Therefore, the control unit can easily control MV data and BV data managed in a manner divided into two kinds by using the access management table and the LDK management table. As a result, a system improved in efficiency and economy can be provided by restraining the wasteful operation of copying and storing a large amount of MV data by the number of clients, which is a problem, and by restraining the use of the disk capacity.

Additionally, the LDK management table may be provided with a column used to manage the attribute of the logical disk and a conversion map column used to manage the address mapping of write data, in addition to a reference logical disk number column used to give a command to refer to the MV logical disk. As a result, efficiency in the data management of the control unit can be improved.

Additionally, a cache memory that temporarily stores read/write data from the logical disk may be provided parallel in the control unit, and it may be first determined whether data about a read command emitted from a client is present in the cache memory by use of the data holding function of the cache memory.

As a result, a system can be provided which is capable of heightening the hit rate of the cache memory during reading by dividing the data into two kinds of data, is capable of quickening the boot operation, and is capable of improving convenience and comfortability in addition to efficiency and economy mentioned above.

Additionally, the network may be the Internet or LAN that uses the iSCSI protocol, or may be SAN that uses the fiber channel protocol.

Additionally, the storage device may be provided with a cache memory that temporarily stores read data from the MV logical disk, and a process for acquiring and reading an MV number from the reference disk number may include a step of first referring to the cache memory and reading an MV from the MV logical disk if the MV is not present in the cache memory.

As a result, a storage management method can be provided which is capable of heightening the hit rate of the cache memory during reading by dividing the data into two kinds of data, is capable of quickening the boot operation, and is capable of improving convenience and comfortability in addition to efficiency and economy mentioned above.

Without being limited to the iSCSI protocol, the present invention can be likewise embodied in a storage system, such as that of the fiber channel protocol, in which the client 1 and the storage device 4 can be directly connected to each other without using a server. For example, Node Name, instead of Initiator Name, can be used as an initiator identifier in the fiber channel protocol at that time.

Additionally, the present invention can be embodied not only in the network boot system but also in a system, such as a "book reading/browsing system," in which MV data is shared between clients, and a part of the data is renewed by each client. In this "book reading/browsing system," each client can directly download and browse book data from the storage device and can set a bookmarker to the book data. In this case, book data is registered in an MV, and a client LDK is set as a BV. Accordingly, a book-data response is made from the MV to the client when the book data is read, and bookmarker data is stored in the BV by the conversion map when bookmarker data is written. Therefore, the storage can be efficiently used, and the entire system having a high-speed responsiveness can be expected to be improved in convenience, comfortability, and economy.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A storage management method for managing, by a storage device, specific data correlated with each of a plurality of client terminals and shared data shareable among the client terminals, the storage device including an MV logical disk (MV: master volume) that stores read-only shared data sharable among the client terminals, a BV logical disk (BV: boot volume) from which or onto which specific data correlated with each client terminal is read and written, and a cache memory for temporarily storing read/write data from at least one of the logical disks, the storage management method comprising:

determining whether a piece of read command data about a read command issued from a client is present in the BV logical disk correlated with each client terminal; and reading, if the read command data is not present in the BV logical disk, the read command data from the MV logical disk and temporarily storing the read command data in the cache memory so as to write data specific to a client into a corresponding BV logical disk and to temporarily store the shared data in the cache memory, whereby the data specific to a client and the shared data sharable among the clients are separated to be managed.

2. A storage control program product for use with managing, by a storage device, specific data correlated with each of a plurality of client terminals and data sharable among the plurality of client terminals, the storage device including an MV logical disk (MV: master volume) that stores read-only shared data sharable among the client terminals, a BV logical disk (BV: boot volume) from which or onto which specific data correlated with each client terminal is read and written, and a cache memory for temporarily storing read/write data from at least one of the logical disks, the storage control program product storing a storage control program causing a computer to execute:

a function to determine whether a piece of read command data about a read command issued from a client is present in the BV logical disk correlated with each client terminal; and a function to read, if the read command data is not present in the BV logical disk, the read command data from the MV logical disk and to temporarily store the read command data in the cache memory so as to write data specific to a client into a corresponding BV logical disk and to temporarily store the shared data in the cache memory, whereby the data specific to a client and the shared data sharable among the clients are separated to be managed.

3. A storage management device for managing specific data correlated with each of a plurality of client terminals and shared data shareable among the client terminals, the storage management device including:

an MV logical disk (MV: master volume) that stores read-only shared data sharable among the client terminals;

a BV logical disk (BV: boot volume) from which or onto which specific data correlated with each client terminal is read and written;

a cache memory for temporarily storing read/write data from the logical disk;

a determining unit for determining whether a piece of read command data about a read command issued from a client is present in the BV logical disk correlated with each client terminal;

a control unit for reading, if the read command data is not present in the BV logical disk, the read command data from the MV logical disk and temporarily storing the read command data in the cache memory so as to write data specific to a client into a corresponding BV logical disk and to temporarily store the shared data in the cache memory; and a management unit for separating and managing the data specific to a client and the shared data sharable among the clients.

* * * * *